H. R. ZIMMER.
CINEMATOGRAPHIC STEREOSCOPE.
APPLICATION FILED FEB. 4, 1919.
1,334,480.
Patented Mar. 23, 1920.
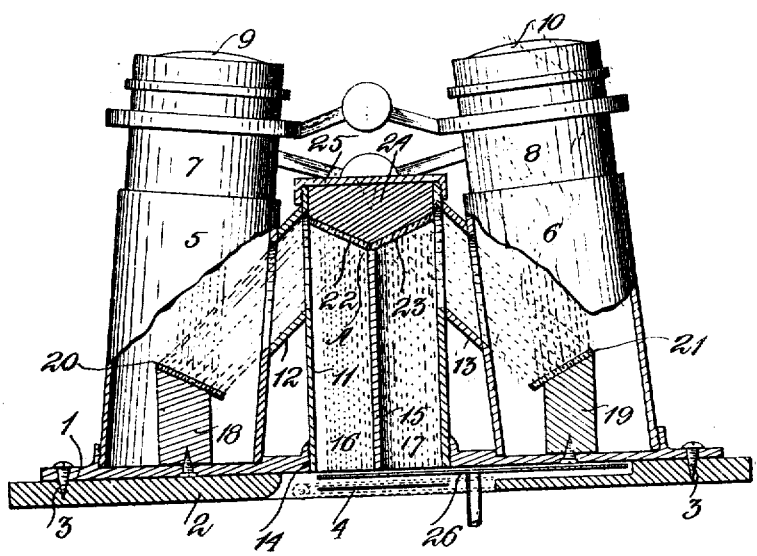
Inventor:
Harry R. Zimmer,
by
Atty.

UNITED STATES PATENT OFFICE.

HARRY R. ZIMMER, OF LOS ANGELES, CALIFORNIA, ASSIGNOR TO THE STEREOTINTO-GRAPH COMPANY, A CORPORATION OF DELAWARE.

CINEMATOGRAPHIC STEREOSCOPE.

1,334,480.  Specification of Letters Patent.  Patented Mar. 23, 1920.

Application filed February 4, 1919. Serial No. 275,275.

*To all whom it may concern:*

Be it known that I, HARRY R. ZIMMER, a citizen of the United States, residing at Los Angeles, county of Los Angeles, and State of California, have invented a certain new and useful Cinematographic Stereoscope, of which the following is a specification.

My invention relates to a means for making cinematograph pictures, and has especial reference to a device for producing stereoscopic pictures more particularly detailed in my co-pending application for patent filed January 27, 1919, Serial No. 273,430, an object of the invention being to provide a simple and inexpensive apparatus for stereoscopically recording pictures, which may be easily and conveniently attached to any motion picture making machine, and by means of which the number of pictures on a film may be increased and the lineal extent of the film considerably reduced.

Other objects will appear from the subjoined specification in connection with the accompanying drawing which represents a plan view, partially in section of a preferred embodiment of the invention.

A base or plate 1, upon which are mounted the elements of the optical instrument, is adapted for attachment to a cinematographic machine, and may be secured to the front board 2 of such a machine by screws 3, or in any other manner, so that the refracted images or objects will be reflected on a film 4, operated intermittently by any of the well known kinetographic movements.

In the base or plate 1 are mounted two tubes 5 and 6, in which telescope respective units 7 and 8, containing the lenses 9 and 10, and diaphragms not shown, and being adjustable by any known means relatively to the tubes 5 and 6 to obtain the proper focus of a refracted or reflected object.

The lenses 9 and 10 in this instance are compounded or arranged for different focal lengths, whereby the distance of refraction of one lens is greater than that of the other and the subsequent viewing of the two refracted images as a merged one will yield an intensity in detail and depth not seen in any single refraction.

The tubes 5 and 6 and their telescoping units 7 and 8 converge toward each other from their bases at such an angle that the lenses 9 and 10 are directed upon the same object or image, or in other words, the longitudinal axes of the tubes 5 and 6 and units 7 and 8 extend in convergent or approximating planes, meeting some definite point.

The tubes 5 and 6 are interconnected with a hollow cylindrical body 11, disposed between said tubes 5 and 6, by angularly disposed annular joints 12 and 13 respectively, establishing light communication between the tubes 5 and 6 and the cylindrical body 11.

The cylindrical body 11 is screwed or otherwise secured in an orifice 14 in the base or plate 1 and is open at one end, to permit the transmission of the light reflection to the film 4. By a wall or partition 15, such cylindrical body is divided into two compartments 16 and 17, the partition also constituting or making the divisional delineation between the pictures.

In each tube and secured to said base 1, is a block 18 and 19 respectively, for supporting an angularly disposed reflector, prism or mirror 20 and 21, which reflects the objects or images focused thereon by the lenses 9 and 10, onto reflectors, prisms or mirrors 22 and 23, mounted on a block 24, secured to a cap 25 threading on the cylindrical body 11, and having the form of an equiangular triangle, whose sides coincide with the angularity of the reflectors, prisms or mirrors 20 and 21 in the tubes 5 and 6, and whose apex A forms the terminus of the wall or partition 15. The reflectors, prisms or mirrors 22 and 23 are therefore, also coincident with the reflectors, prisms or mirrors 20 and 21, and by means of them the objects reflected by the mirrors 20 and 21 are reflected upon the film.

A rotatory shutter 26 controls the exposure and closure during the respective standstill and intermittent movement of the films, in the usual manner.

What I claim is:

1. A stereoscopic attachment for cinematographic cameras, comprising a base, a plurality of angularly disposed tubes mounted thereon, lens carrying units telescoping in said tubes, a cylindrical body open at one end, and conjoined with said tubes by angular passageways, a partition dividing said body into two compartments, and a means in said tubes and compartments to reflect images through the open end of said body.

2. A stereoscopic attachment for cinematographic cameras, comprising a base, a plurality of angularly disposed tubes mounted thereon, lens carrying units telescoping in said tubes, a cylindrical body between said tubes open at one end and conjoined with said tubes with passageways, a partition dividing said body into two compartments, an angularly disposed reflecting means in each of said tubes and in line with the focus of the lenses, and a reflecting means in each of said compartments and angularly disposed relatively to the reflecting means in said tubes.

3. A stereoscopic attachment for cinematographic cameras, comprising two angularly disposed tubes, each having a telescoping lens carrying unit, a cylindrical body between and connected with said tubes by passageways, said body being open at one end, a partition dividing said body into two compartments and a series of reflecting means in said tubes and body to reflect images focused by said lenses.

4. A stereoscopic attachment for cinematographic cameras, comprising a base having an aperture, two tubes mounted on said base and angularly disposed relatively to each other, a lens carrying unit telescoping in each tube, a block in each tube, a reflecting means angularly mounted on each block and in line with the focus of the lenses, an open ended cylindrical body between said tubes and extending in said aperture, means forming passageways conjoining the tubes and body, a cap on said body, a block on said cap, reflecting means on said block and disposed angularly relatively to said reflecting means in said tubes, and a partition in said cylindrical body.

5. A stereoscopic attachment for cinematographic cameras, comprising a base having an aperture, two tubes mounted on said base and angularly disposed relatively to each other, a lens carrying unit telescoping in each tube, an angularly disposed reflector in rear end of each tube and in line with the focus of the lenses, a cylindrical body between said tubes and extending in said aperture, means forming passageways conjoining the tubes and body, a partition in and dividing said body into two compartments, and a reflector in the forward end of each of said compartments and disposed in line with the reflector in said tubes.

In testimony whereof I have set my hand in the presence of two witnesses.

HARRY R. ZIMMER.

Witnesses:
W. H. DUTTON,
ANTON GLOETZNER, Jr.